Figure 1:
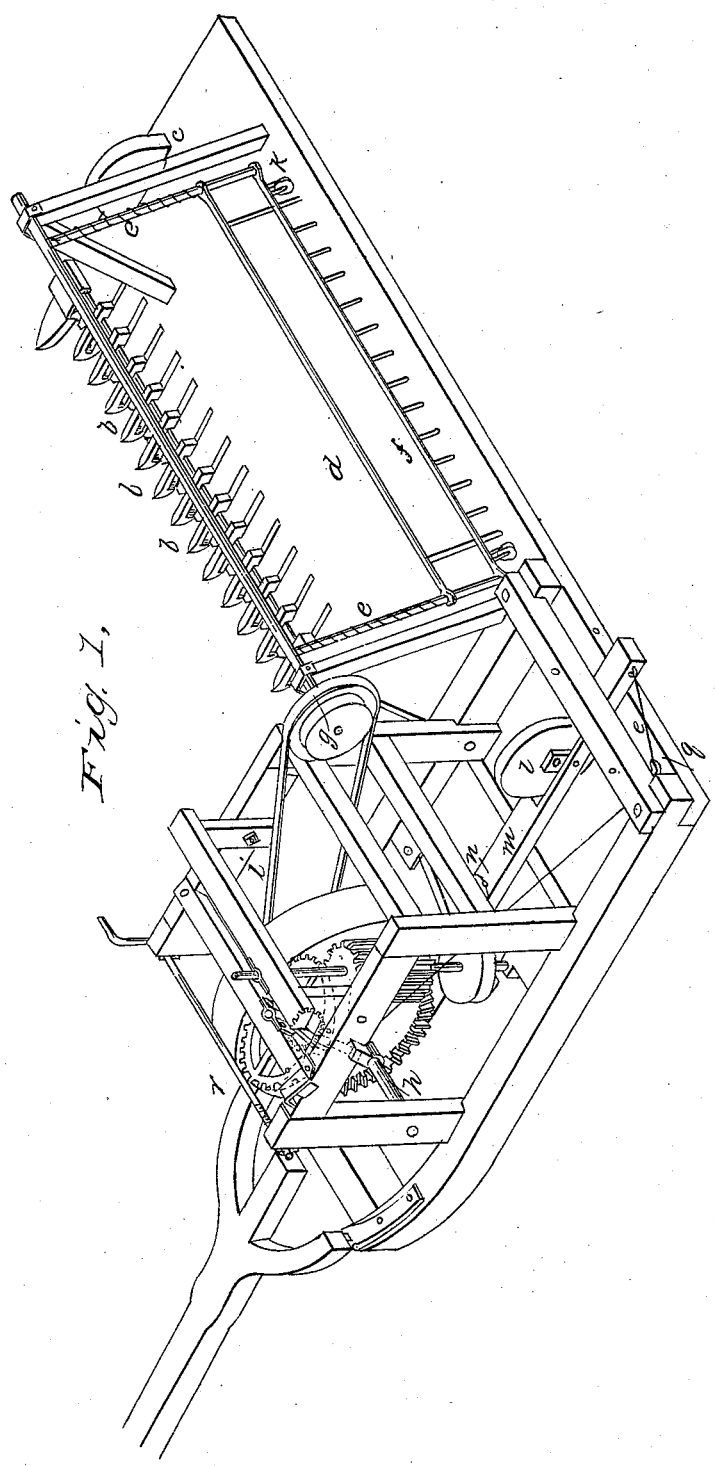

A. J. COOK.
Reaping Machine.

No. 4,861.

Patented Nov. 20, 1846.

UNITED STATES PATENT OFFICE.

ANDREW J. COOK, OF DELPHI, INDIANA.

IMPROVEMENT IN MOWING-MACHINES.

Specification forming part of Letters Patent No. 4,861, dated November 20, 1846.

*To all whom it may concern:*

Be it known that I, ANDREW J. COOK, of Delphi, in the county of Carroll and State of Indiana, have invented a new and useful Improvement in Reaping and Harvesting Machines; and I do hereby declare that the following is a full, clear, and exact description of the principle or character which distinguishes it from all other things before known, and of the manner of making, constructing, and using the same, reference being had to the accompanying drawing, making part of this specification, in which—

Figure 1 is an isometrical view of the machine.

The same letters indicate like parts.

The nature of my invention consists in the construction and movement of a rake for taking the grain or straw off the platform of the cutters at regular intervals, and in the manner of steering the machine.

The general arrangements of my machine are like those now in use. On the platform $a$, behind the cutters $b$, standards $c$ are erected, which support the shaft $d$ of a revolving rake. Two arms, $e$, project from this shaft parallel to each other, to which the rake-head $f$ is attached, and on which it slides up and down. A spring is put on each of the arms $e$, that tends to push the rake-head out. On the inner end of the shaft there is a pulley, $g$, which is connected with a pulley (not shown in the drawing) on the shaft $h$, that drives it by a band, $i$. This causes the rake to revolve, sweeping the grain off the platform at regular intervals into gavels. Two small trucks, $k$, are attached to the rake-head, one at each end, to prevent the teeth from scraping on the platform.

The method of steering the machine is by means of a small wheel, $l$, attached to a beam or frame, $m$, the front end of which is connected to the frame by a pivot, $n$, and the other end has liberty to move from side to side, guided by two bars, $o$ $o$, of the frame. This end is moved sidewise by a cord, $p$, (shown by red lines,) which passes from the frame $m$ around a pulley, $q$, and thence up to windlass, $r$, in front, which is turned by a hand-crank. This wheel is only drawn one way, as the resistance against the cutters tends to turn it the other way.

What I claim as my invention, and desire to secure by Letters Patent, is—

1. The revolving rake, constructed and combined with the cutting apparatus in the manner described.

2. The arrangement for steering the machine, as herein fully described, in combination with the grain-cutting apparatus, as herein fully set forth.

A. J. COOK.

Witnesses:
 THOMAS J. BARTON,
 ALFRED BAKER.